(12) United States Patent
Ohtani et al.

(10) Patent No.: US 11,597,273 B2
(45) Date of Patent: Mar. 7, 2023

(54) VEHICULAR GEAR SYSTEM FRICTION REDUCTION

(71) Applicant: FORD GLOBAL TECHNOLOGIES, LLC, Dearborn, MI (US)

(72) Inventors: Hiroko Ohtani, Dearborn Heights, MI (US); Kevin Richard John Ellwood, Ann Arbor, MI (US); David Karl Bidner, Livonia, MI (US); Arup Kumar Gangopadhyay, Novi, MI (US); Mathew John Fast, Dearborn Heights, MI (US); Phillip Bonkoski, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 838 days.

(21) Appl. No.: 16/242,224

(22) Filed: Jan. 8, 2019

(65) Prior Publication Data
US 2020/0215905 A1  Jul. 9, 2020

(51) Int. Cl.
*F16H 48/08* (2006.01)
*F16H 47/04* (2006.01)
*B60K 17/16* (2006.01)
*C10M 145/28* (2006.01)
*C10M 145/36* (2006.01)
*B60K 17/04* (2006.01)
*B60K 6/365* (2007.10)
*F16H 57/04* (2010.01)
*C10N 40/04* (2006.01)

(52) U.S. Cl.
CPC ............ *B60K 17/046* (2013.01); *B60K 6/365* (2013.01); *B60K 17/16* (2013.01); *C10M 145/28* (2013.01); *F16H 57/0427* (2013.01); *F16H 57/0483* (2013.01); *C10M 145/36* (2013.01); *C10M 2209/104* (2013.01); *C10N 2040/04* (2013.01); *F16H 47/04* (2013.01); *F16H 48/08* (2013.01)

(58) Field of Classification Search
CPC ...... B60K 17/046; B60K 6/365; B60K 17/16; F16H 57/0427; F16H 57/0483; F16H 57/04; F16H 5/0447; F16H 5/0449; F16H 5/0423; F16H 57/02; F16H 57/0475; F16H 57/0421; C10M 169/04; C10M 169/06; C10M 141/10; B60B 35/00
See application file for complete search history.

(56) References Cited

U.S. PATENT DOCUMENTS 3,903,001 A * 9/1975 Gates ..................... C07F 9/02
                                              508/337
3,954,627 A * 5/1976 Dreher ................. C10M 173/00
                                              507/135
5,703,023 A * 12/1997 Srinivasan ........... C10M 145/16
                                              508/468

(Continued)

*Primary Examiner* — Tinh Dang
(74) *Attorney, Agent, or Firm* — Vincent Mastrogiacomo Brooks Kushman P.C.

(57) ABSTRACT

An automotive axle includes a housing including gears and a bath lubricating the gears, the bath including gear oil and about 0.1 to 5 wt. % secondary alcohol ethoxylate based on total weight of the bath such that during automotive operation at temperatures less than a threshold, reverse micelles form to trap air bubbles in the bath, emulsifying the bath, and at temperatures greater than the threshold, the reverse micelles dissipate.

19 Claims, 3 Drawing Sheets

(56) References Cited

U.S. PATENT DOCUMENTS

| | | | | |
|---|---|---|---|---|
| 6,299,561 | B1* | 10/2001 | Kramer | F16H 57/0447 |
| | | | | 184/13.1 |
| 7,456,138 | B2* | 11/2008 | Sherman | C10M 173/02 |
| | | | | 508/579 |
| 7,897,552 | B2* | 3/2011 | Ellington | C10M 163/00 |
| | | | | 508/584 |
| 8,138,130 | B2* | 3/2012 | Nelson | C10M 133/56 |
| | | | | 508/232 |
| 8,802,606 | B2* | 8/2014 | Rabbat | C10M 161/00 |
| | | | | 508/517 |
| 9,006,158 | B2* | 4/2015 | Lange | C07D 265/16 |
| | | | | 44/422 |
| 9,340,746 | B1* | 5/2016 | Henly | C10M 161/00 |
| 10,144,896 | B2* | 12/2018 | Ekman | C10M 125/04 |
| 11,453,836 | B2* | 9/2022 | Wendker | C10M 107/04 |
| 2001/0031855 | A1* | 10/2001 | Pollmann | C10M 173/02 |
| | | | | 528/425 |
| 2002/0051801 | A1* | 5/2002 | Abu-Jawdeh | C10L 1/328 |
| | | | | 424/401 |
| 2013/0248292 | A1* | 9/2013 | Mordukhovich | F16N 39/00 |
| | | | | 184/6.5 |
| 2014/0113847 | A1* | 4/2014 | Givens | C10M 169/041 |
| | | | | 508/468 |
| 2015/0051131 | A1 | 2/2015 | Kim et al. | |
| 2016/0097720 | A1* | 4/2016 | Martin | G01N 21/643 |
| | | | | 250/459.1 |
| 2016/0168504 | A1 | 6/2016 | Lee | |
| 2018/0223175 | A1* | 8/2018 | Al-Yami | C09K 8/48 |
| 2018/0235208 | A1* | 8/2018 | Faers | A01N 43/56 |
| 2019/0128401 | A1* | 5/2019 | Hayes | F16N 7/38 |

\* cited by examiner

VEHICULAR GEAR SYSTEM FRICTION REDUCTION

TECHNICAL FIELD

The disclosure relates to lubricant-derived fuel efficiency improvement of a gear system of a vehicle by reducing friction in the gear system via chemistry adjustment of the gear oil, and a method of using the same.

BACKGROUND

The requirements for good fuel economy have become increasingly important in automotive manufacturing. To meet the requirements, different methods of improving fuel efficiency have been identified. For example, it has become increasingly popular in vehicle body manufacturing to lower the weight of the vehicle, improve the aerodynamics of the vehicles, or increase efficiency of the powertrain. Yet, there are many vehicular systems which contribute to lower fuel efficiency due to friction, driveline devices representing such systems.

SUMMARY

In at least one embodiment, an automotive axle is disclosed. The automotive axle includes a housing including gears and a bath lubricating the gears. The bath includes gear oil and may additional include about 0.1 to 5 wt. % secondary alcohol ethoxylate based on total weight of the wet bath such that during automotive operation at temperatures less than a threshold, reverse micelles form to trap air bubbles in the wet bath, and at temperatures greater than the threshold, the reverse micelles dissipate. The threshold may be about 100° C. to 135° C. At temperatures less than the threshold, the bath has substantially reduced viscosity $v1$ compared to viscosity $v2$ of an otherwise same wet bath devoid of the secondary alcohol ethoxylate. The automotive axle may be a rear-wheel axle. The gear oil may be a synthetic gear oil. The gears may include a planetary gear. The trapped air bubbles aerate the bath only at temperatures less than the threshold.

In an alternative embodiment, a vehicular gear system is disclosed. The system may include a housing including a plurality of gears being lubricated by a wet bath. The wet bath includes gear oil and an emulsifier such that during vehicular operation at temperatures less than a threshold, the wet bath forms an emulsion with gas bubbles and has reduced kinematic viscosity $v1$ compared to kinematic viscosity $v2$ of an otherwise same wet bath devoid of the emulsifier, and at temperatures greater than the threshold, the wet bath has kinematic viscosity $v3$ substantially similar to kinematic viscosity $v4$ of an otherwise same wet bath devoid of the emulsifier. The threshold is about 100° C. to 135° C. The gear system may include rear wheel axle. The emulsifier may be a non-ionic surfactant. The emulsifier may include one or more secondary alcohol ethoxylates. The surfactant may be added in the amount of about 0.1 to 5 wt. %, based on the total weight of the wet bath. The gear system is a non-pressurized system. The gas bubbles may include ambient air bubbles.

In a yet alternative embodiment, an automotive non-pressurized system is disclosed. The system may include a wet bath lubricating a plurality of driveline devices. The system includes a base oil and about 0.1 to 5 wt. % non-ionic surfactant, based on total weight of the wet bath. During automotive operation, at temperatures less than a threshold, a monolayer of reverse micelles forms at an air-oil interface of the bath to stabilize ambient air bubbles in the bath, resulting in the bath reduced kinematic viscosity $v1$ compared to kinematic viscosity $v2$ of an otherwise same wet bath devoid of the non-ionic surfactant, and at temperatures greater than a threshold, the reverse micelles destabilize, the bath releases the air bubbles, resulting in kinematic viscosity $v3$ substantially similar to kinematic viscosity $v4$ of an otherwise same wet bath devoid of the non-ionic surfactant. The threshold may be about 100° C. to 135° C. The system may include a differential. The driveline devices may include a plurality of gears. The non-ionic surfactant may include one or more secondary alcohol ethoxylates.

DETAILED DESCRIPTION

Figure 1:
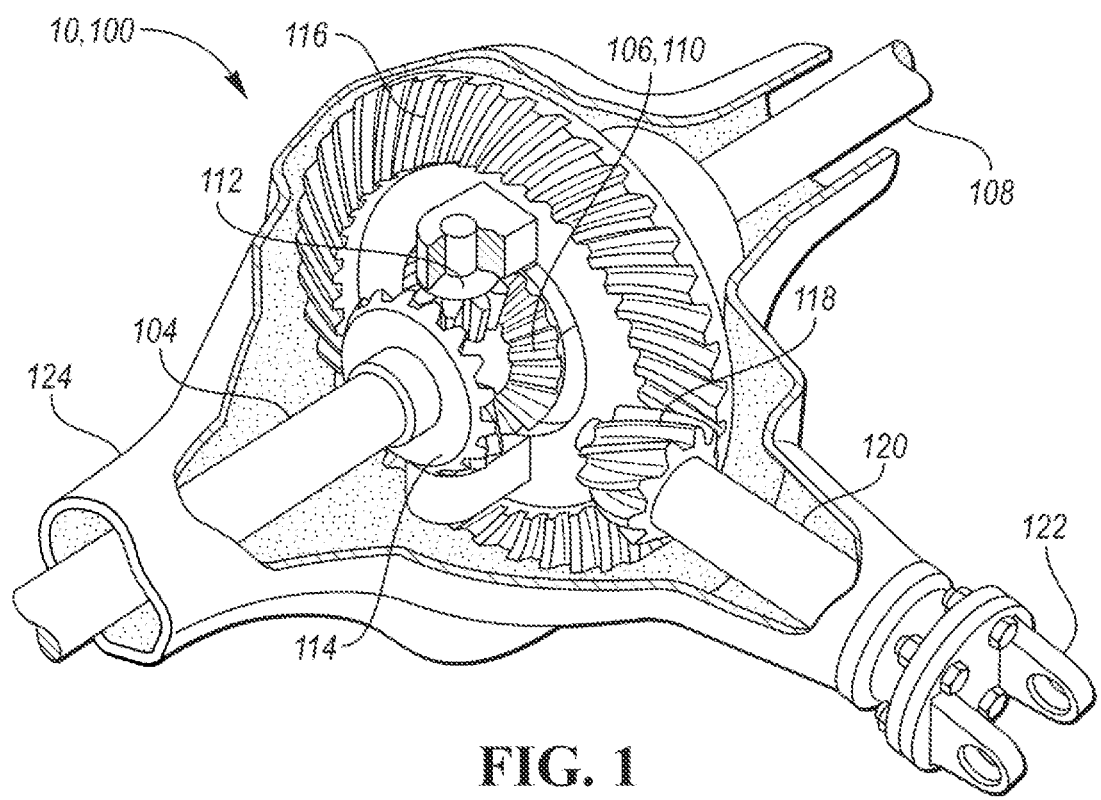
FIG. 1 depicts an exemplary schematic view of a rear axle gear system in accordance with at least one embodiment.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5%, or 10% of the value or relative characteristic.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The ever-increasing environmental requirements coupled with a market demand for high efficiency vehicles have resulted in an emphasis on improvements to fuel economy. One aspect of improving vehicular fuel efficiency has been an effort to improve lubricant-derived fuel efficiency. Vehicles include a number of moving parts immersed in a fluid to lubricate individual portions of the moving system. Generally, energy loss is associated with the moving parts due to friction. A lubricant is typically included to reduce friction, which in turn reduces the energy loss. But at the same time, fuel economy is not the only factor which needs to be considered when choosing a lubricant for the moving parts. Durability and wear of the moving parts such as driveline devices need to be controlled so that durability and warranty standards are met.

One of the goals of the lubricant-derived fuel economy has been a pursuit of a driveline device lubricant which has sufficiently low viscosity to provide improved fuel economy. Yet, low viscosity lubricants typically may not maintain a thick and stable lubricant film between the moving parts during high operating temperatures. As a result, wear protection and durability of the moving parts may be diminished once a higher temperature range is reached. On the other hand, a high viscosity lubricant capable of providing sufficient wear and durability protection during the increased temperatures may be too thick to prevent energy loss.

For example, rear-wheel vehicles typically lose about 1-3% Label Fuel Economy (EPA) when forced to use a lubricant with high viscosity to prevent typical durability and warranty issues associated with lubricant friction in the rear axle. Using a lubricant with low viscosity could result in fuel economy benefits. For example, switching from a relatively highly viscous oil 75W-140 to less viscous oil 75W-85 would result in about a 40% 140 kJ reduction of parasitic energy, which may correspond to up to 3.0% CAFÉ; rolling friction may be reduced by 6% below the 75W-80 parasitic energy, torque at speeds above 500 rpm represents approximately 8.5% reduction of parasitic torque. Thus, there are apparent advantages to using a lower viscosity oil in the gear systems. But when the relatively low viscosity lubricants are used, the gear system durability such as the rear axle durability and warranty typically do not meet required standards at higher temperatures such as when towing and during hot weather conditions.

Thus far, finding a balanced lubricant for the driveline devices has been a challenge. Typical products attempting to provide a balanced lubricant include one or more additives such as viscosity adjusters, modifiers, or viscosity index improvers capable of arresting the decrease of viscosity with temperature. Yet, such adjusted lubricants have limitations as to the degree of fuel economy improvement because the lubricant still has to maintain certain degree of viscosity to achieve hardware durability, wear protection, and high load-carrying capacity. Additionally, many substances which have been experimentally added to the base oil may be helpful at low temperatures, but may be disruptive to lubrication and/or cooling at high temperatures.

According to one or more embodiments, a solution to the one or more problems discussed above is disclosed by introducing a new approach to the lubricant-derived fuel economy. A vehicular non-pressurized system 10 is disclosed. The system 10 may be present in any vehicle. The vehicle may be a rear-wheel vehicle, front-wheel vehicle, or all-wheel vehicle. Non-limiting exemplary types of vehicles include land vehicles such as automobiles, buses, vehicles for transportation of goods, trucks, motorcycles, off-road vehicles, sports utility vehicles, tracked vehicles, trains, amphibious vehicles, aircrafts, space crafts, watercrafts, or the like. The vehicles may be petroleum vehicles, diesel vehicles, biodiesel vehicles, alternative fuel vehicles, hybrid vehicles, electric vehicles, plug-in vehicles, or the like.

The system 10 may be any system including one or more driveline power transmitting devices such as axle(s), transmission, and the like with splashing lubrication. The system 10 may be any vehicular system 10 including one or more gears or cogwheels such as external gears, internal gears, spurs, helical gears, double helical gears, bevels, spiral bevels, hypoid gears, crown gears, worms, non-circular gears, epicyclic gears, sun and planetary gears, harmonic gears, cage gears, cycloidal gears, spider wheels, the like, or a combination thereof. The system 10 may include transmission, differential, axle such as front axle, rear axle, or the like. A non-limiting example system 10 may be a rear axle 100, depicted in FIG. 1.

As can be seen in FIG. 1, a rear axle 100 is an integral component of a wheeled vehicle. A non-limiting example of a rear axle 100 is a drive axle for rotating wheels by transmitting rotational force from a driveshaft to the wheels, maintaining position of the wheels relative to each other and to the vehicle body. The rear axle 100 is a split axle with a differential. A half-axle 104 connects the differential 106 with the left rear wheel (not depicted), and a second half-shaft 108 connects the differential 106 with the right rear wheel (not depicted). The differential 106 may include planetary gears such as the sun gear or differential side gear 110, the spider gears 112 connected to the axle shaft side gear 114, and a ring or hypoid gear 116 connected to the pinion gear 118 on the pinion shaft 120 leading to a joint 122 connecting the axle 100 with a driveshaft (not depicted). Other or different gears may be included.

The system 10 is a non-pressurized system. The system 10 allows presence and/or influx of ambient air to one or more components of the system 10. The system 10 includes at least one fluid to lubricate the gears present in the system 10. The at least one fluid may be kept within a housing 124, cover, enclosure, or the like, an example of which is depicted in FIG. 1. The at least one fluid may form a bath. The bath may lubricate, coat, and/or bathe one or more components of the system 10. For example, one or more gears of the system 10 may be at least partially or fully submerged, coated with, or be in contact with the at least one fluid. The housing 124 may be filled only partially with the fluid or wet bath such that the wet bath has a discernible surface level. The fill level of the housing 124 may differ. The housing 124 allows access to ambient air such that the wet bath may be in contact with the air and be aerated during operation of the system 10.

The bath may include one or more components. The bath may include (A) a base oil or gear oil. The base or gear oil may be any commercially available gear oil for use in a vehicle to provide lubrication to a gear system. The base oil may be natural, synthetic, or a mix of both. The base oil may contain one oil or a mixture of two or more oils. The oil may be refined, unrefined, reprocessed. The base oil may be any oil, or a mixture of oils, as defined by the American Petroleum Institute in Groups I-V. An example base oil may include petroleum-derived oil such as poly-alpha-olefin (PAO) synthetic oil, oil-soluble polyalkylene glycol (OSP)

synthetic oil, mineral oil(s), gas-to-liquid (GTL) base oils, silicone oils, phosphate esters, diesters, polyol esters, or the like.

The base oils of different groups have different viscosity indices (VI). Viscosity index is a unitless measure of the change of viscosity with temperature. The lower the viscosity index, the more the viscosity is affected by changes in temperature. The higher the viscosity index, the more stable the viscosity across a range of temperatures. The base oil of the present disclose may have VI of 80 or greater such as 120, 130, 135, 140, or greater than 140 such as 150, 160, 170, 180, 190, or 200. In general, high VI of 120 or more is desirable since at elevated temperatures, such oil provides a good lubrication film and wear protection to the moving parts while as the oil operating temperature decreases, viscosity of the oil will not increase as much as that of an oil with a lower VI, preventing decrease in fuel efficiency of the vehicle.

The base oil, and/or the wet bath, may optionally include (B) one or more additives such as anti-wear agents, detergents, dispersants, friction modifiers, pressure agents, antioxidants, the like, or a combination thereof.

In one or more embodiments, the wet bath is altered by addition of (C) a surfactant. A surfactant is a substance which tends to reduce the surface tension of a liquid in which it is dissolved. The surfactant is a non-ionic surfactant. The non-ionic surfactant has a hydrophilic head group and a hydrophobic tail. The non-ionic surfactant may have strong emulsifying properties. The surfactant may be used as an emulsifier. The emulsifier may be used in pure form or as a solution of one or more emulsifiers.

The surfactant may include one or more components. For example, the non-ionic surfactant may include ethoxylate(s); alkoxylate(s); cocamide; polyvinyl alcohol still containing about 5-50%, preferably about 8-20%, of vinyl acetate units; alkyl polyglycol ethers; alkylaryl polyglycol ethers; adducts of alkylamines having alkyl radicals of 8 to 22 carbon atoms with ethylene oxide or propylene oxide; fatty acids having 6 to 24 carbon atoms; alkylpolyglycosides. The non-ionic surfactant may include natural substances and derivatives thereof, such as lecithin, lanolin, saponins, cellulose, cellulose alkyl ethers and carboxyalkylcelluloses whose alkyl groups each possess up to 4 carbon atoms. The surfactant may include ethylene oxide/propylene oxide (EO/PO) block copolymers.

Preferably, the surfactant is hydrocarbon-based. Preferably, the surfactant includes a secondary alcohol ethoxylate or a mixture of secondary alcohol ethoxylates. The surfactant may have a hydrophilic polyethylene oxide chain and an aromatic lipophilic or hydrophobic group. The hydrophilic polyethylene oxide chain may have on average 1.5 to 55, 4.5 to 30, to 7.5 to 12 ethylene oxide units. The surfactant may be octylphenol ethoxylate, polyoxyethylene alkylether, polyoxyalkylene alkylether, or a mixture thereof.

The surfactant may have a relatively high wetting, low dynamic surface tension, low equilibrium surface tension, low foaming, and may be readily dispersible in water. The surfactant may have hydrophile-lipophile balance (HLB) of about 10 to 18.4, 10.5 to 14.5, or 10.8 to 12. The surfactant may have about 3 to 55, 5 to 20, or 7 to 15 moles of ethylene oxide (EO). The surfactant may have pour point, measured by ASTM D97, of about −57° C. to 39° C., −18° C. to 20° C., or −9° C. to 9° C. The surfactant may have surface tension (dynes/cm at 1% actives, 25° C.) of about 29 to 52, 25 to 38, or 30 to 40.

The non-ionic surfactant is a surfactant capable of adjusting rheological properties of the base oil or the wet bath, changing one or more physical properties of the base oil or the wet bath, or otherwise altering behavior of the base oil or the wet bath. The surfactant is capable of increasing air-intake of the wet bath. The surfactant is capable of increasing air-intake of the wet bath at temperatures less than a threshold. The increased aeration effect of the wet bath disappears or diminishes at temperatures greater than the threshold. The threshold may be above about 40, 45, 50, 55, 60, 65, 70, 75, 80, 85, 90, 95, 100, 105, 110, 115, 120, 125, 130, 135, or 140° C. or more. The threshold may be about 60 to 80° C., 80 to 100° C., or 100 to 135° C.

The amount of the surfactant added to the wet bath may be about 0.1 to 10 wt. %, 0.5 to 7 wt. %, or 1 to 5 wt. %, based on total weight of the wet bath.

Figure 2A:
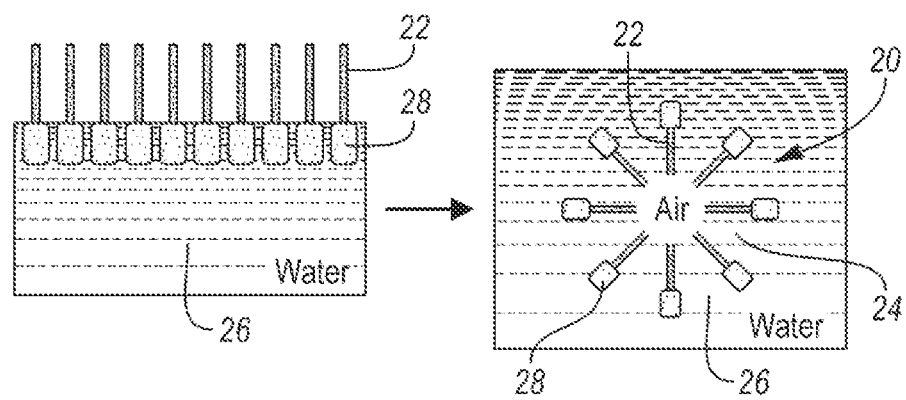
FIG. 2A depicts a schematic view of a micelle.

Since the non-ionic surfactant has hydrophilic and hydrophobic portions, it may form a monolayer at the air-oil interface of the wet bath. At lower temperatures such as about 20, 25, 30, 35, or 40° C., several surfactant molecules form reverse micelles at the air-oil interface of the wet bath. A micelle 20, schematically depicted in FIG. 2A, is a lipid molecule which arranges itself in a generally spherical form in an aqueous solution. The formation of the micelle 20 is a response to the amphipathic nature (containing both hydrophilic and hydrophobic portions) of fatty acids. The hydrophobic nonpolar portions, tails, 22 of several surfactant molecules assemble into an oil-like core 24, the most stable form being free of contact with a surrounding polar solvent 26. The hydrophilic polar portions, heads 28, point towards and are in contact with the polar solvent 26.

Figure 2B:
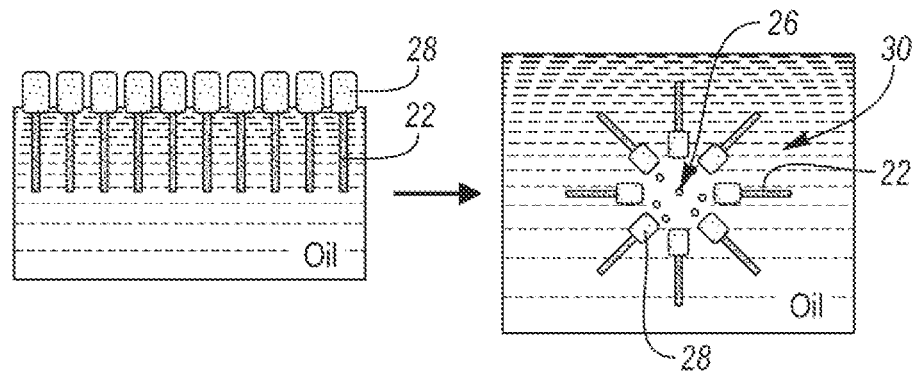
FIG. 2B shows a schematic illustration of a revere micelle.

A reverse micelle 30, depicted in FIG. 2B, on the other hand, is a micelle in which the nonpolar and polar phases have reversed roles such that the orientation of surfactant molecules are inverted. The polar head groups 28 point into the enclosed volume of the polar phase 26, and the nonpolar tails 22 are in contact with the nonpolar liquid.

The surfactant described herein is a non-ionic surfactant which causes formation of reverse micelles in the oil-based wet bath at the air-oil interface. As was stated above, the wet bath is in an enclosure or housing which allows access or influx of ambient air. Presence of the surfactant in the wet bath adjusts surface tension of the air-oil interface such that reverse micelles form and promote aeration of the wet bath. Without limiting the disclosure to a single theory, it is believed that the reverse micelles trap the air bubbles in the wet bath and cause formation of froth, foam, a mass of small bubbles, which do not rise to the surface of the wet bath, but rather stay entrained within the bath. The air bubbles originate from ambient air, which has access or is being supplied to the wet bath during operation of the system 10. The air may be introduced into the wet bath via a motion of the mechanism of the system 10 submerged in or coated with the wet bath. For example, serrations, teeth, points, protrusion, or another portion of one or more gears may introduce air into the wet bath by a downward movement, upward movement, or another movement of the gear through the bath. The presence of air bubbles lowers density, dynamic, and kinematic viscosity of the wet bath at temperatures below the threshold.

When the air bubbles are present in the wet bath with the surfactant, the wet bath has substantially reduced viscosity v1 compared to viscosity v2 of an otherwise similar wet bath under the same conditions but being devoid of the surfactant. The wet bath with the surfactant is thus less viscous, flows better, and friction within the system, is lessened. As a consequence, the fuel economy is improved in the desirable range of temperatures below the threshold. The reverse micelles thus effectively stabilize air bubbles in the wet bath at the temperatures less the threshold; the threshold being about 40° C. to 130° C., 60° C. to 120° C., or 80° C. to 100° C.

The amount or volume of air bubbles is thus significantly increased during operation of the system in comparison to any possible aeration naturally present in a typical wet bath under the identical agitation conditions. The amount of air bubbles is adjustable, depending on the type of wet bath, type of surfactant, amount of surfactant, presence of moisture in the air, and/or other factors. For example, the reverse micelles may be stabilized by presence of moisture in the air. Providing air with increased humidity may further stabilize the micelles.

This viscosity-lowering effect caused by the combined aeration and reverse micelles diminishes and eventually disappears at temperatures greater than the threshold. The reverse micelles destabilize as higher temperatures lower moisture content of the air. The viscosity of the wet bath is lower at higher temperatures and the air bubbles are thus released more rapidly from the bath. Once the micelles destabilize, the aeration stops or returns to its minimum so that air bubbles are not being trapped in the wet bath anymore. As a result, at temperatures greater than the threshold, the wet bath has a substantially similar viscosity v3 as viscosity v4 of an otherwise identical, similar, or same wet bath under the same conditions but being devoid of the emulsifier.

Since the wet bath has v3 at temperatures greater than the threshold, for example temperatures above about 100° C. or 130° C., when relatively high viscosity is needed for robustness and durability reasons, the gear system or transmission is protected during high rpm, towing, high ambient temperatures, high temperatures within the system, the like, or a combination thereof. v1, v2, v3, and v4 may relate to kinematic viscosity, dynamic viscosity, or both.

Likewise, density d1 is a density of the wet bath at temperatures less than the threshold, named above, and density d2 at temperatures greater than the threshold. d2>d1.

It was thus unexpectedly discovered that the presence of reverse micelles of the surfactant in the wet bath together with atmospheric moisture, provided by aeration, agitation, operation of the system, result in lower density and viscosity of the wet bath when compared to an identical, similar, or same wet bath devoid of the surfactant. Unlike other solutions, searching for an oil or wet bath with a high VI number, which may potentially not meet durability and robustness standards, this disclosure provides a solution utilizing an existing base oil, meeting robustness and durability standards, especially at high temperatures, while at lower temperatures brings fuel efficiency improvements. An addition of a non-ionic surfactant described herein is also an economical way of increasing fuel economy, especially in comparison to alternative methods such as dry sump rear axles.

EXAMPLES

Example 1 and Comparative Example A

A wet bath including base oil 75W-85 and 1 wt. % surfactant, based on total weight of the wet bath, was prepared as Example 1. The surfactant used was a secondary propylene ethoxylate, specifically non-ionic hydrocarbon-based high wetting surfactant, dispersible in water, with HLB of about 10, surface tension of about 25 dynes/cm at 0.1% concentration, and pour point according to ASTM D97 of about −57° C. Comparative example A, a wet bath containing base oil 75W-85 without a surfactant was prepared. Density, dynamic viscosity, and kinematic viscosity of both Example 1 and Comparative Example A were assessed before and/or after agitation.

Figure 3A:
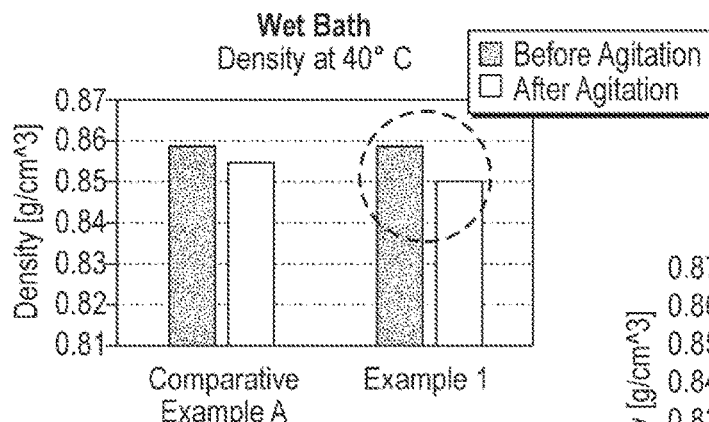
FIGS. 3A and 3B show density of a gear oil wet bath with and without a lubricant at 40° C. and 80° C., respectively.
Figure 3B:
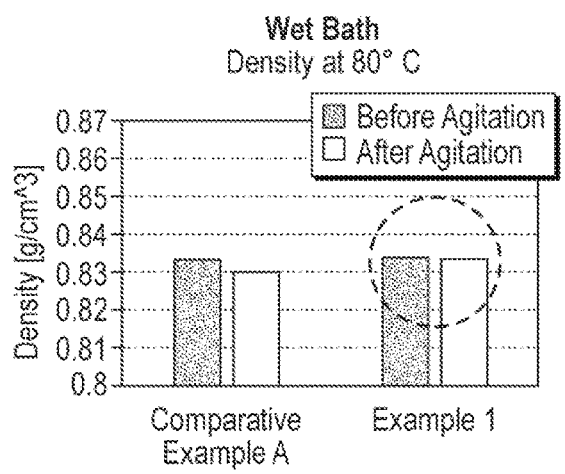

To measure density and kinematic viscosity, SVM 3000 Stabinger Viscosimeter was used. A tube was filled with Example 1 and another tube was filled with Comparative Example A. Both tubes, one at a time, were rotated at a constant speed for about 5 minutes. Density was assessed before and after agitation at 40° C. (FIG. 3A) and at 80° C. (FIG. 3B). As can be observed from FIGS. 3A and 3B, presence of the surfactant in Example 1 caused a significant decrease in density after agitation at 40° C., but not at 80° C.

Figure 4:
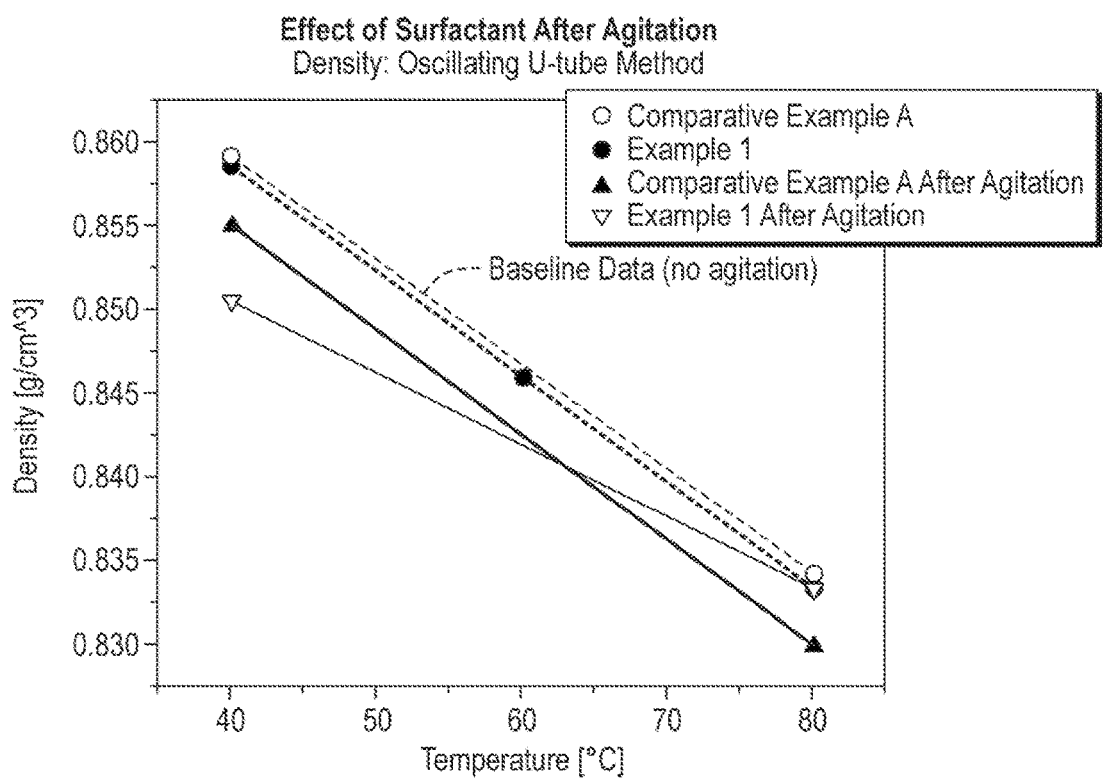
FIG. 4 is a plot illustrating density change of different wet baths with increasing temperature.

FIG. 4 shows the effect of the surfactant in Example 1 in comparison to Comparative Example A, with no agitation and after agitation.

Figure 5:
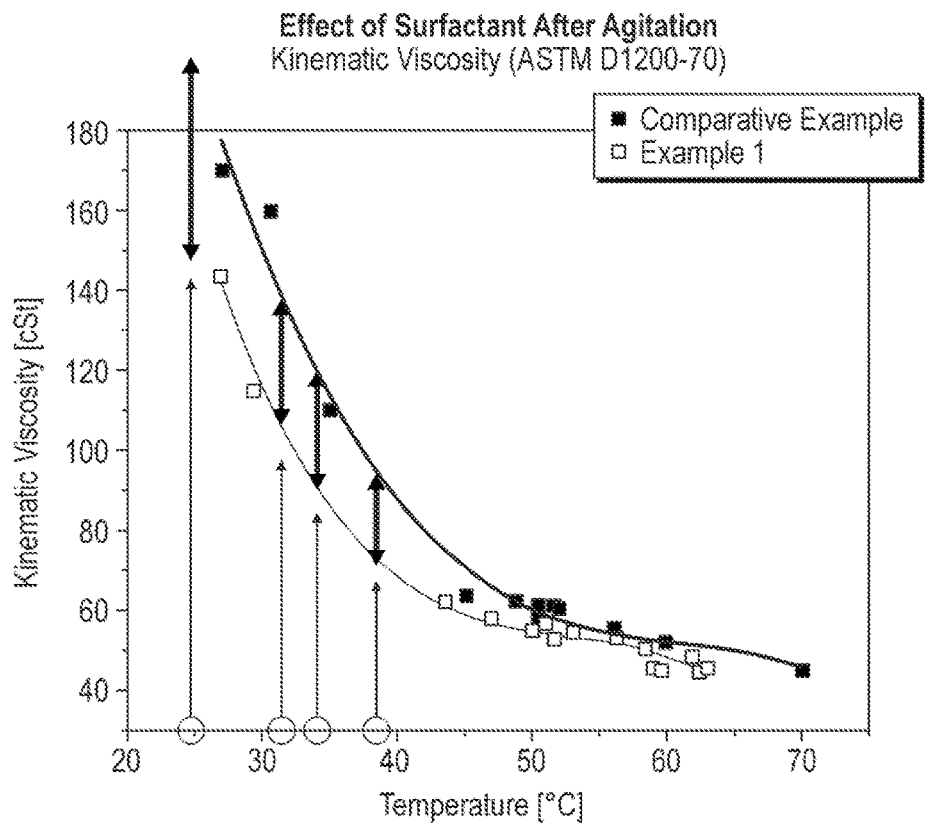
FIG. 5 is a plot showing effect of a surfactant in a wet bath on kinematic viscosity.

Kinematic viscosity was measured at different temperatures according to ASTM D1200-70. The result of the measurement can be seen in FIG. 5, which shows a plot of kinematic viscosity at different temperatures. The plot shows that during the low temperature range of about 20° C. to 40° C., the temperatures during which increased fuel economy is sought, the increased aeration due to the presence of the surfactant and formation of micelles has resulted in decreased kinematic viscosity of the wet bath of Example 1 compared to Comparative Example A. The decrease is between 20 and 30 cSt. Yet, at higher temperatures of above about 50° C., the kinematic viscosity of the wet bath of Example 1 does not diminish at the same rate, and the viscosity decrease in comparison to Comparative Example A is minimal such that viscosity of Example 1 and Comparative Example A are substantially similar.

Dynamic viscosity was assessed using the Ford viscosity cup, which is a standard procedure used for measurement of paint dynamic viscosity. The Ford viscosity cup is a gravity device permitting the timed flow of a known volume of liquid passing through an orifice located at the bottom of the cup. The Example 1 and Comparative Example A were heated to a desired temperature in a container. An orifice was blocked at the bottom of the cup size #4 and the sample was poured into the cup until the sample overflew over the edges of the cup. Excess liquid was scraped off. Temperature of the sample was measured. The orifice was unblocked and timer was set to measure the timed flow. The timer was stopped when the sample flow was interrupted, when the liquid started to drip.

Figure 6A:
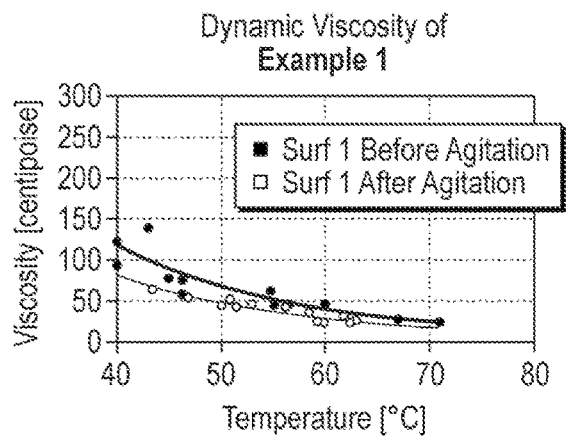
FIGS. 6A and 6B show plots of dynamic viscosity against temperature.
Figure 6B:
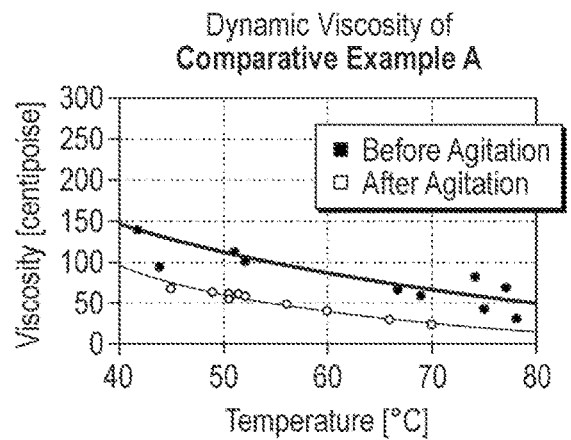

FIGS. 6A and 6B show results of the Ford cup test. As can be seen in FIG. 6A, dynamic viscosity reduction decreased with increasing temperature for Example 1. In contrast, there was uniform dynamic viscosity reduction across the temperature range associated with Comparative Example A.

In one or more embodiments, a method of improving fuel economy of a vehicle is disclosed. The vehicle may be a rear-wheel vehicle, all-wheel vehicle, or front-wheel vehicle having a driveline device or a gear system described above. The method includes providing a wet bath having a base oil and mixing the base oil with a surfactant named above, in the amount described above. The method may include emulsifying the base oil via an addition of the surfactant. The wet bath has viscosity v1 below the temperature threshold and v3 above the temperature threshold.

The method further includes providing the wet bath into a housing containing the gear system and coating at least a portion of the gear system with the wet bath, immersing the gear system in the wet bath, or submerging the gear system at least partially in the wet bath. The method may also include exposing the housing, the gear system, the wet bath, to ambient air such that the gear system, when in its operational state, may draw the ambient air by its motion into the wet bath such that air bubbles are entrained into the wet bath. The method may include providing a froth of small air bubbles in the wet bath.

The method may include bringing the gear system into its operational state. The method may include operating the system at relatively low temperature of the gear system, low ambient temperature, low rpm, temperature below the threshold, or a combination thereof, and causing or encouraging aeration of the wet bath such that density, kinematic, and dynamic viscosity of the wet bath v1 is lower than viscosity v2 of a substantially similar or identical wet bath under substantially similar or identical conditions but being devoid of the surfactant. The temperature may be below about 40, 50, 60, 70, 80, 90, 100, 110, 120, 130° C., or higher. The threshold is about 40, 50, 60, 70, 80, 90, 100, 110, 120, 130° C., or higher. The method may include increasing rpm, increasing temperature of the gear system either by operation of the vehicle or due to environmental factors such as high ambient temperature, or a combination thereof, and diminishing the aeration effect such that density, kinematic viscosity, and dynamic viscosity at temperatures above the threshold are substantially similar or identical to the density, kinematic viscosity, and dynamic viscosity of a substantially similar or identical wet bath but being devoid of the surfactant. The method may include bringing the system, the wet bath, or both above the threshold temperature. The method may include operating the system above the threshold temperature.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An automotive axle comprising:
a housing including gears and a bath lubricating the gears, the bath including gear oil and 0.1 to 5 weight %, based on total weight of the bath, of one or more ethoxylate surfactants including an propylene ethoxylate surfactant such that during automotive operation
at temperatures less than a threshold, reverse micelles form to trap air bubbles in the bath, emulsifying the bath, and
at temperatures greater than the threshold, the reverse micelles dissipate.

2. The axle of claim 1, wherein, at temperatures less than the threshold, the bath has a reduced first viscosity compared to a second viscosity of an identical bath without the secondary alcohol propylene ethoxylate.

3. The axle of claim 1, wherein the automotive axle is a rear-wheel axle.

4. The axle of claim 1, wherein the gear oil is a synthetic gear oil.

5. The axle of claim 1, wherein the gears include a planetary gear.

6. The axle of claim 1, wherein the trapped air bubbles aerate the bath at temperatures less than the threshold and dissipate at temperatures above the threshold.

7. A vehicular gear system comprising:
a housing including a plurality of gears being lubricated by a wet bath, the wet bath including gear oil and an emulsifier solution including a surfactant selected from the group consisting of cocamide, polyvinyl alcohol having 5 to 50% vinyl acetate units, alkylaryl polyglycol ethers, adducts of alkylamines having alkyl radicals of 8 to 22 carbon atoms with ethylene oxide or propylene oxide, fatty acids having 6 to 24 carbon atoms, alkylpolyglycosides, lecithin, lanolin, saponins, cellulose alkyl ethers, carboxyalkylcelluloses, and secondary propylene ethoxylate such that during vehicular operation
at temperatures less than a threshold, the wet bath forms an emulsion with gas bubbles and has a reduced first kinematic viscosity compared to a second kinematic viscosity of an otherwise same wet bath devoid of the emulsifier, and
at temperatures greater than the threshold, the wet bath has a third kinematic viscosity within 10% of a fourth kinematic viscosity of an identical wet bath without the emulsifier.

8. The gear system of claim 7, wherein the gear system includes rear wheel axle.

9. The gear system of claim 7, wherein the emulsifier is a non-ionic surfactant.

10. The gear system of claim 7, wherein the emulsifier includes one or more secondary alcohol ethoxylates.

11. The gear system of claim 7, wherein the emulsifier is added in an amount of 0.1 to 5 weight %, based on a total weight of the wet bath.

12. The gear system of claim 7, wherein the gear system is a non-pressurized system.

13. The gear system of claim 7, wherein the gas bubbles include ambient air bubbles.

14. An automotive non-pressurized system comprising:
a wet bath lubricating a plurality of driveline devices and including a base oil having a viscosity index of 120 or more and 0.1 to 5 weight % non-ionic surfactant including a secondary propylene ethoxylate surfactant, based on total weight of the wet bath, such that during automotive operation
at temperatures less than a threshold, a monolayer of reverse micelles forms at an air-oil interface of the wet bath to stabilize ambient air bubbles in the wet bath, resulting in a reduced first kinematic viscosity compared to a second kinematic viscosity of an otherwise same wet bath devoid of the non-ionic surfactant, and
at temperatures greater than the threshold, the reverse micelles destabilize and the wet bath releases the air bubbles, resulting in a third kinematic viscosity within 10% of a fourth kinematic viscosity of an identical wet bath without the non-ionic surfactant.

15. The system of claim 14, wherein the system includes a differential.

16. The system of claim 14, wherein the driveline devices include a plurality of gears.

17. The system of claim 14, wherein the wet bath includes a mixture of secondary alcohol ethoxylates.

18. The axle of claim 1, wherein the one or more ethoxylate surfactants include a secondary alcohol ethoxylate.

19. The system of claim 7, wherein the one or more ethoxylate surfactants include a secondary propylene ethoxylate.

* * * * *